United States Patent
Soliman et al.

(10) Patent No.: US 12,202,755 B2
(45) Date of Patent: Jan. 21, 2025

(54) SEGREGATION AND TREATMENT OF WASTE WATER STREAMS FOR ENHANCED OIL RECOVERY

(71) Applicant: Saudi Arabian Oil Company, Dhahran (SA)

(72) Inventors: Mohamed Ahmed Soliman, Ras Tanura (SA); Abdulaziz Y. Ammar, Dammam (SA); Ahmed Bu Ali, Dammam (SA); Seung-Hak Choi, Dhahran (SA); Hasan Al Abdulgader, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 56 days.

(21) Appl. No.: 18/068,997

(22) Filed: Dec. 20, 2022

(65) Prior Publication Data

US 2024/0199462 A1    Jun. 20, 2024

(51) Int. Cl.
*E21B 43/20*        (2006.01)
*B01D 61/00*        (2006.01)
(Continued)

(52) U.S. Cl.
CPC ........... *C02F 9/00* (2013.01); *B01D 61/0022* (2022.08); *B01D 61/0023* (2022.08);
(Continued)

(58) Field of Classification Search
CPC ..... E21B 43/20; E21B 43/34; B01D 61/0022; B01D 61/0023; B01D 61/005; C02F 1/04;
(Continued)

(56) References Cited

U.S. PATENT DOCUMENTS

| 4,632,818 A | 12/1986 | Chen et al. |
| 6,451,252 B1 | 9/2002 | Ruan et al. |

(Continued)

FOREIGN PATENT DOCUMENTS

| CA | 2764156 | 12/2010 |
| CA | 2921749 | 8/2017 |

(Continued)

OTHER PUBLICATIONS

Foster, "Plasma-based water Purification: Challenges and Prospects for the Future," Physics of Plasmas, 2017, 24:055501, 17 pages.
(Continued)

*Primary Examiner* — Matthew R Buck
(74) *Attorney, Agent, or Firm* — Fish & Richardson P.C.

(57) ABSTRACT

Example methods and systems for segregation and treatment of waste water streams for enhanced oil recovery are disclosed. One example method includes generating concentrated solution by treating, using a forward osmosis process, waste water of one or more gas streams from a gas plant associated with one or more gas wells, where draw solution of the forward osmosis process includes produced water from one or more crude oil production traps, and the waste water contains kinetic hydrate inhibitor (KHI). The concentrated solution is treated using an oxidation process to generate oxidized solution by decomposing the KHI in the waste water. The oxidized solution is injected into an oil reservoir through a water injection well for enhanced oil recovery.

20 Claims, 11 Drawing Sheets

(51) Int. Cl.

| | |
|---|---|
| *C02F 1/04* | (2023.01) |
| *C02F 1/44* | (2023.01) |
| *C02F 1/463* | (2023.01) |
| *C02F 1/467* | (2023.01) |
| *C02F 1/78* | (2023.01) |
| *C02F 9/00* | (2023.01) |
| C02F 103/10 | (2006.01) |

(52) U.S. Cl.
CPC .......... *B01D 61/005* (2013.01); *E21B 43/20* (2013.01); *C02F 1/04* (2013.01); *C02F 1/445* (2013.01); *C02F 1/463* (2013.01); *C02F 1/4672* (2013.01); *C02F 1/78* (2013.01); *C02F 2103/10* (2013.01); *C02F 2209/10* (2013.01)

(58) Field of Classification Search
CPC ........ C02F 1/445; C02F 1/463; C02F 1/4672; C02F 1/78; C02F 9/00; C02F 2103/10; C02F 2209/10
See application file for complete search history.

(56) References Cited

U.S. PATENT DOCUMENTS

| | | | |
|---|---|---|---|
| 7,901,578 B2* | 3/2011 | Pruet .................. | B01D 17/085 210/257.2 |
| 7,994,374 B2 | 8/2011 | Talley et al. | |
| 8,702,994 B2 | 4/2014 | Frost et al. | |
| 8,728,325 B2* | 5/2014 | Hussain ................. | C02F 1/725 210/759 |
| 8,980,798 B2 | 3/2015 | Tian et al. | |
| 8,992,780 B2 | 3/2015 | Champion et al. | |
| 9,637,404 B2* | 5/2017 | Minnich ............... | C02F 1/5236 |
| 10,384,967 B2* | 8/2019 | Hancock ............... | B01D 61/364 |
| 10,392,271 B2 | 8/2019 | Janson et al. | |
| 11,000,778 B2 | 5/2021 | Rithauddeen et al. | |
| 11,040,904 B2* | 6/2021 | Herron ..................... | C02F 9/00 |
| 11,691,119 B2 | 7/2023 | Zhang et al. | |
| 2010/0224561 A1* | 9/2010 | Marcin ................ | B01D 61/025 210/209 |
| 2010/0300872 A1 | 12/2010 | Gutsol et al. | |
| 2013/0168315 A1* | 7/2013 | Minier Matar ........... | C02F 9/00 210/638 |
| 2018/0370834 A1* | 12/2018 | Sutton-Sharp ......... | B01D 61/16 |
| 2019/0118114 A1 | 4/2019 | Rithauddeen et al. | |
| 2020/0398245 A1 | 12/2020 | Zhang et al. | |
| 2023/0183588 A1 | 6/2023 | Al-Qahtani et al. | |
| 2024/0109034 A1 | 4/2024 | AlQahtani et al. | |
| 2024/0109776 A1 | 4/2024 | AlQahtani et al. | |
| 2024/0150203 A1 | 5/2024 | AlQahtani et al. | |

FOREIGN PATENT DOCUMENTS

| | | | | |
|---|---|---|---|---|
| CN | | 1386563 | | 12/2002 |
| CN | | 103043840 | | 4/2013 |
| CN | | 106277531 A | * | 1/2017 ................ C02F 9/00 |
| CN | | 110127623 | | 8/2019 |
| EP | | 2770041 | | 8/2014 |
| KR | | 101189834 | | 9/2012 |
| KR | | 102202958 B1 | * | 1/2021 |
| WO | WO 2013093789 | | | 6/2013 |
| WO | WO 2013121217 | | | 8/2013 |

OTHER PUBLICATIONS

Kelland, "A Review of Kinetic Hydrate Inhibitors from an Environmental Perspective," Energy and Fuels, 2018, 32:12001-12012, 39 pages.

Sanito et al., "Degradation of contaminants in plasma technology: An overview," Journal of Hazardous Materials, 2022, 424:127390, 20 pages.

Sato et al., "Degradation of organic contaminants in water by plasma," International Journal of Plasma Environmental Science and Technology, Mar. 2009, 3(1):8-14, 7 pages.

Singh et al., "Rapid Removal of Poly- and Perfluorinated Compounds from Investigation-Derived Waste (IDF) in a Pilot-Scale Plasma Reactor," Environmental Science & Technology, 2019, 29 pages.

Wang et al., "Performance Evaluation of Hybrid Gas-Liquid Pulse Discharge Plasma-Induced Degradation of Polyvinyl Alcohol-Containing Wastewater," Plasma Chem Plasma Process, 2014, 34:1115-1127, 13 pages.

Zeghioud et al., "Review on Discharge Plasma for Water Treatment: Mechanism, Reactor Geometries, Active Species and Combined Processes," Journal of Water Process Engineering, 2020, 38, 101664, 13 pages.

Borraccia et al., "Oxygen enrichment in Sulphur plants to reduce the life cycle costs of new-build, large gas plants," Abu Dhabi International Petroleum Exhibition & Conference, Nov. 2016, 15 pages.

Dang et al., "Research on decomposition of hydrogen sulfide using non-thermal plasma with metal oxide catalysis," Energy Procedia, 2012, 16:856-862, 7 pages.

DuPont.com [online], "DuPont Ligasep degasification modules," Mar. 2020, retrieved on Jul. 14, 2022, retrieved from URL <https://www.dupont.com/content/dam/dupont/amer/us/en/water-solutions/public/documents/en/45-D02249-en.pdf>, 4 pages.

He et al., "Dielectric Barrier Discharge for Hydrogen Sulphide Waste Gas Decomposition," IOP Conference Series: Earth and Environmental Science, Feb. 2019, 237:22052, 8 pages.

Jarrige et al., "Decomposition of Gaseous Sulfide Compounds in Air by Pulsed Corona Discharge," Plasma Chemistry and Plasma Processing, May 2007, 27:241-255, 15 pages.

Kolbasi, "Oxygen enrichment at Sulphur recovery unit," Refining Community Presentation, May 2018, 27 pages.

Palma et al., "A review about the recent advances in selected nonthermal plasma assisted solid-gas phase chemical processes," Nanomaterials, Aug. 2020, 10:1596, 56 pages.

Papasidero et al., "Improving operability and process understanding of sulfur recovery unit," Chemical Engineering Transactions, May 2012, 26:237-242, 6 pages.

Paskall et al., "Can oxygen enrichment replace tail gas clean up in sulphur recovery?" Sulphur Recovery, Western Research, 8th edition, 2003, Chapter 8-3, 8 pages.

Paskall et al., "So you don't have a COS/CS2 problem, eh?" Sulphur Recovery, Western Research, 8th edition, 2003, Chapter 2-79, 5 pages.

Reddy et al., "Kinetics of hydrogen sulfide decomposition in a DBD plasma reactor operated at high temperature," Journal of Energy Chemistry, 2013, 22:382-386, 5 pages.

Xuan et al., "Plasma oxidation of H2S over non-stoichiometric LaxMnO3 perovskite catalysts in a dielectric barrier discharge reactor," Catalysts, Aug. 2018, 8:317, 14 pages.

* cited by examiner

SEGREGATION AND TREATMENT OF WASTE WATER STREAMS FOR ENHANCED OIL RECOVERY

TECHNICAL FIELD

The present disclosure relates to methods and systems for treatment of waste water streams.

BACKGROUND

In oil and gas industry, natural gas hydrates can accumulate on inner walls of pipes or fluid receptacles, blocking the flow of the fluid stream there through and fouling equipment. Therefore hydrate formation is an operational and safety concern, as hydrates can reduce production rates, plug transmission pipelines, or form ice balls that can act as solid projectiles damaging the downstream instruments and processes. Kinetic hydrate inhibitors (KHIs) are substances such as water-soluble polymers that inhibit the formation of hydrates, for example, by slowing the nucleation or growth of hydrate crystals. KHIs can be used to inhibit natural gas hydrate formation. Treating a fluid stream with KHIs can enable fluid streams to pass along a flow path with reduced hydrate formation. However KHIs may become less soluble and even precipitate at higher temperature or salt content of the water phase.

SUMMARY

The present disclosure involves methods and systems for segregation and treatment of waste water streams for enhanced oil recovery. One example method includes generating concentrated solution by treating, using a forward osmosis process, waste water of one or more gas streams from a gas plant associated with one or more gas wells, where draw solution of the forward osmosis process includes produced water from one or more crude oil production traps, and the waste water contains kinetic hydrate inhibitor (KHI). The concentrated solution is treated using an oxidation process to generate oxidized solution by decomposing the KHI in the waste water. The oxidized solution is injected into an oil reservoir through a water injection well for enhanced oil recovery (EOR).

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

This specification relates to process and method of segregating and treating waste water associated with gas streams to remove KHIs from the waste water and use the treated waste water for enhanced oil recovery (EOR). In some implementations, this involves utilizing high salinity gas oil separation plant (GOSP) produced water from crude oil high pressure production traps (HPPT), low pressure production traps (LPPT), low pressure degassing tanks (LPDT), or dehydrators to extract pure water from the condensed water vapor in the gas pipelines containing the gas field chemicals such as kinetic hydrate inhibitor (KHI) and corrosion inhibitor and consequently concentrate KHIs. The extraction of pure water from the condensed water vapor in the gas pipelines can be done by decomposing gas field chemicals that cause incompatibility, for example, kinetic hydrate inhibitors (KHIs) and other added chemicals such as corrosion inhibitor and biocide to reduce the formation blockage as a result of precipitation of KHI at high temperature or high salinity at downhole. Decomposing gas field chemicals such as KHIs involves a two-step process consisting of volume reduction of waste water streams containing kinetic hydrate inhibitor (KHI) by vibrationally assisted forward osmosis followed by combined electrocoagulation and electrochemical oxidation process to degrade KHI. The oxidized solution can be injected into an oil reservoir through a water injection well for enhanced oil recovery.

In some implementations, the draw solution to forward osmosis can be high salinity produced water from crude oil production traps. Forward osmosis can be accomplished by utilizing osmotic pressure differential between the high salinity produced water and condensed water from gas streams, thereby decomposing gas field chemicals and safely dispose the associated water. Additionally, a vibration-assisted forward osmosis process can be used to reduce membrane fouling. This vibration produces shear waves that can prevent potential stagnation and fouling. The aforementioned two-step process can utilize the high osmotic pressure of produced water to concentrate the gas field chemicals and utilize the produced low salinity power water injection requirement for enhanced oil recovery.

The subject matter described in this specification can be implemented in particular embodiments so as to realize one or more of the following advantages. Gas field chemicals such as KHIs that may damage the formation or cause incompatibility when mixed with other chemicals can be decomposed. The formation blockage as a result of precipitation of KHIs can be reduced. The precipitation of KHIs at valves, pumps, and heat exchangers inside the gas oil separation plant can be reduced. Environmental pollution resulting from produced water can be reduced. Water incompatibility at reservoir conditions can be reduced.

Figure 1:
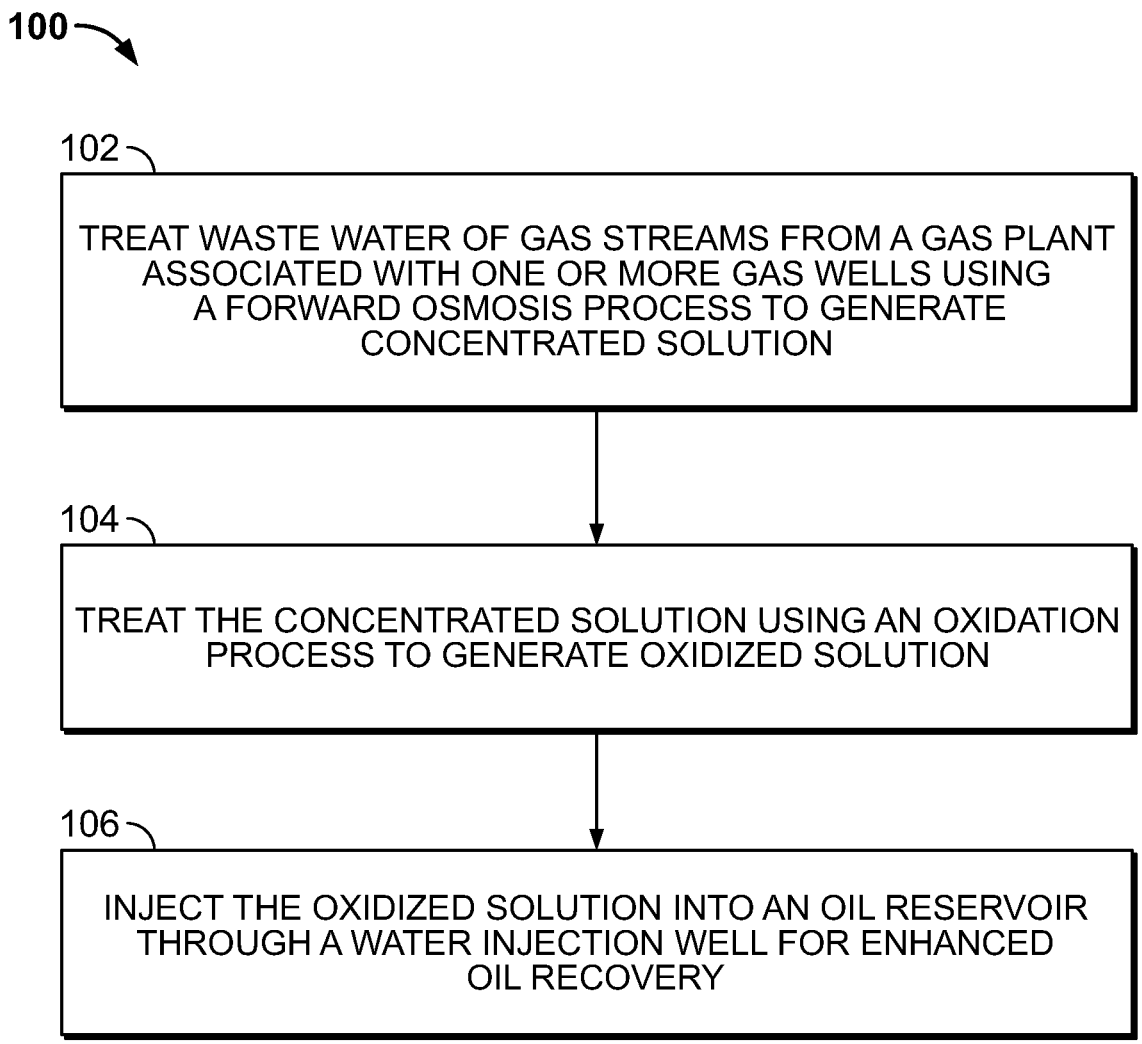
FIG. 1 illustrates an example of a flow diagram for treating waste water streams for enhanced oil recovery.

FIG. 1 illustrates an example of a flow diagram 100 for treating waste water streams for enhanced oil recovery. At 102, waste water of gas streams from a gas plant associated with one or more gas wells is treated using a forward osmosis (FO) process to generate concentrated solution. Forward osmosis membrane or vibrationally assisted forward osmosis membrane can be used to reduce fouling in the FO process. The shear stress can be generated on the membrane surface when the membranes are vibrating using various modules such as rotating disks, vibrating flat sheet membranes, as well as vibrating hollow fibers based on vibratory shear enhanced process (VSEP). Additionally, the application of shear stress can induce boundary layer disturbance for mitigating concentration polarization effects and controlling fouling.

In some implementations, the forward osmosis membrane can be a semi-permeable membrane that can be characterized as having small pores such that water molecules can pass freely, while the passage of solute molecules is hindered or stopped, such that the solute molecules do not pass through. The semi-permeable membrane of the vibrationally assisted forward osmosis unit can be selected from a flat membrane, a spiral wound membrane, a tubular membrane, or combinations of the same. The tubular membrane can have a cross section selected from circular, square, rectangular, and triangular. The tubular membrane can include hollow membranes. The semi-permeable membrane can also be a spiral wound membrane. The semi-permeable membrane can be a tubular membrane containing hollow fibers. The semi-permeable membrane can be constructed from organic materials or mineral or ceramic materials. Organic materials can include cellulose acetate, cellulose nitrate, polysulfone, polyvinylidene fluoride, polyamide, and acrylonitrile copolymers. Mineral or ceramic materials can include C—Al—O, ZrO, TiO2 or a mixed oxide of SiO, and Al—O or ZrO2. The semi-permeable membranes can be composites of organic materials and mineral or ceramic materials. The semi-permeable membranes can be designed for the specific application, in light of the solids and other contaminants in the water. The semi-permeable membrane can include a feed side and a draw side.

Figure 2:
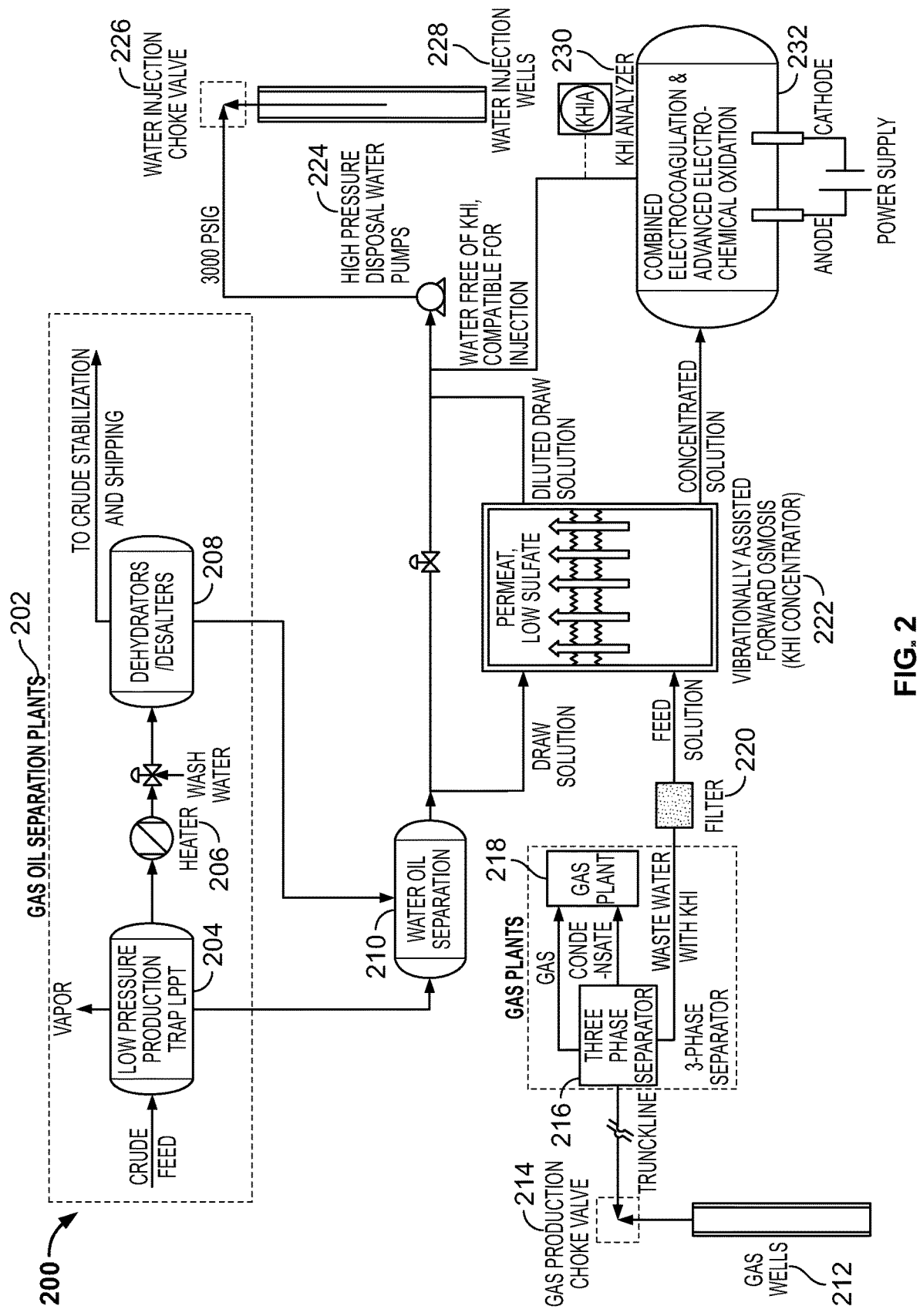
FIG. 2 illustrates an example of a schematic diagram for concentrating and decomposing KHI in waste water from gas streams based on a combination of electrocoagulation and electrochemical oxidation process.

In some implementations, the produced water can be collected from various gas oil separation plant (GOSP) equipment and then treated in water oil separation plant (WOSEP) to remove oil content to less than 100 ppm. FIG. 2 illustrates an example 200 of a schematic diagram for concentrating and decomposing KHI in waste water from gas streams, where KHI decomposition is done using a combination of electrocoagulation and electrochemical oxidation process. The treated produced water from water oil separation plant (WOSEP) 210 can be used as a draw solution to concentrate and absorb the water from the feed solution (waste water with KHI from the three-phase separator 216) using forward osmosis membranes. The generated diluted draw solution from vibrationally assisted forward osmosis process 222 can be pumped by high pressure disposal water pumps 224 into the oil reservoir through water injection wells 228 for enhanced oil recovery.

In some implementations, during the forward osmosis process, the water in a lower-concentration solution (e.g., waste water with KHI from the three-phase separator 216) with lower osmotic pressure permeates and moves through a semi permeable membrane toward a higher-concentration solution (e.g., the produced water) with higher osmotic pressure. Example operating pressure and temperature ranges for GOSP equipment are shown in Table 1 below.

TABLE 1

|  | Pressure Range, psig | Temperature Range, F. |
|---|---|---|
| LPPT | 35-90 | 70-150 |
| Dehydrators | 40-200 | 70-170 |
| WOSEP | 35-70 | 70-150 |
| Discharge of High Pressure Disposal water Pumps | 2000-3200 | 70-150 |
| KHI & Chemical Storage | 0-5 | 60-120 |
| Feed Solution | 5-200 | 60-120 |
| Draw Solution | 5-200 | 70-150 |

In some implementations, the osmotic pressure is the minimum pressure applied to a solution to prevent the inward flow of its pure solvent across a semipermeable membrane. For an ideal solution, the relationship between the osmotic pressure of a solution and the molar concentration of its ions is $\pi=CRT$, where, $\pi$ is the osmotic pressure, C is the molar concentration of the ions in the solution in mol/liter, R is the universal gas constant (0.08206 L atm $mol^{-1}$ $K^{-1}$), and T is the temperature on the Kelvin scale. Example total dissolved solid (TDS) and osmotic pressure ranges are shown in Table 2 below.

TABLE 2

|  | Produced Water | Condensed Water vapor |
|---|---|---|
| Total Dissolved Solid, ppm | 125,000-280,000 | 0-35,000 |
| Osmotic Pressure ranges, psig | 1,700-4,100 at 170 F. | 0-420 at 100 F. |

For the flux, water transport through the membrane is a function of differential pressure, and can be stated as $J_w=KW(\Delta P-\lambda\pi)$, where, $J_w$=rate of water passage through the membrane, KW=permeability coefficient for water for a particular membrane, thus area and thickness are included, $\Delta P$=hydraulic pressure differential, and $\Delta\pi$=osmotic pressure differential.

At 104, the concentrated feed solution is treated using an oxidation process to generate oxidized solution. The oxidation process can be a combined electrocoagulation and electrochemical oxidation process. An example of the oxidation process for treating the concentrated feed solution is shown in FIG. 2, where the concentrated feed solution containing KHI, from vibrationally assisted forward osmosis process 222, can be treated in significantly reduced volume in combined electrocoagulation and electrochemical oxidation unit 232 to safely decompose the KHI and other gas field chemicals and to generate oxidized solution, which is water from combined electrocoagulation and electrochemical oxidation unit 232, free of KHI, and compatible for injection into water injection wells 228.

In some implementations, the electrochemical treatment of gas condensed water can be used to treat the gas condensed water containing KHI, oil, suspended solids and other chemicals that is disposed of and allow the treated water to be reused for pressure maintenance without any formation. Therefore this can provide an alternative resource for groundwater used for pressure maintenance and help in conserving water.

In some implementation, during the electrocoagulation process, electricity can be conducted into water with high ionic concentration to drive chemical reactions that can reduce the concentration of dissolved and emulsified oil, KHI, other gas field chemicals, and suspended solids. Electrocoagulation reactions can include anode side reactions and cathode side reactions.

For anode side reactions, first metals are oxidized and electrons are released: $M \rightarrow M^{z+}+Ze^-$. Next chloride ions are oxidized: $2Cl^- \rightarrow Cl_2+2e^-$. Then depending on the pH, one of two reactions can take place. Under acidic conditions: $Cl_2+H_2O \rightarrow HOCl+Cl^-+H^+$, and under basic conditions: $HClO \rightarrow H^+ + ClO^-$.

For cathode side reactions, water decomposes as: $H_2O+3e^- \rightarrow 3/2H_2+3OH^-$. Coagulants are formed as: $M^{z+}+ZOH^- \rightarrow M(OH)_z$.

Figure 3:
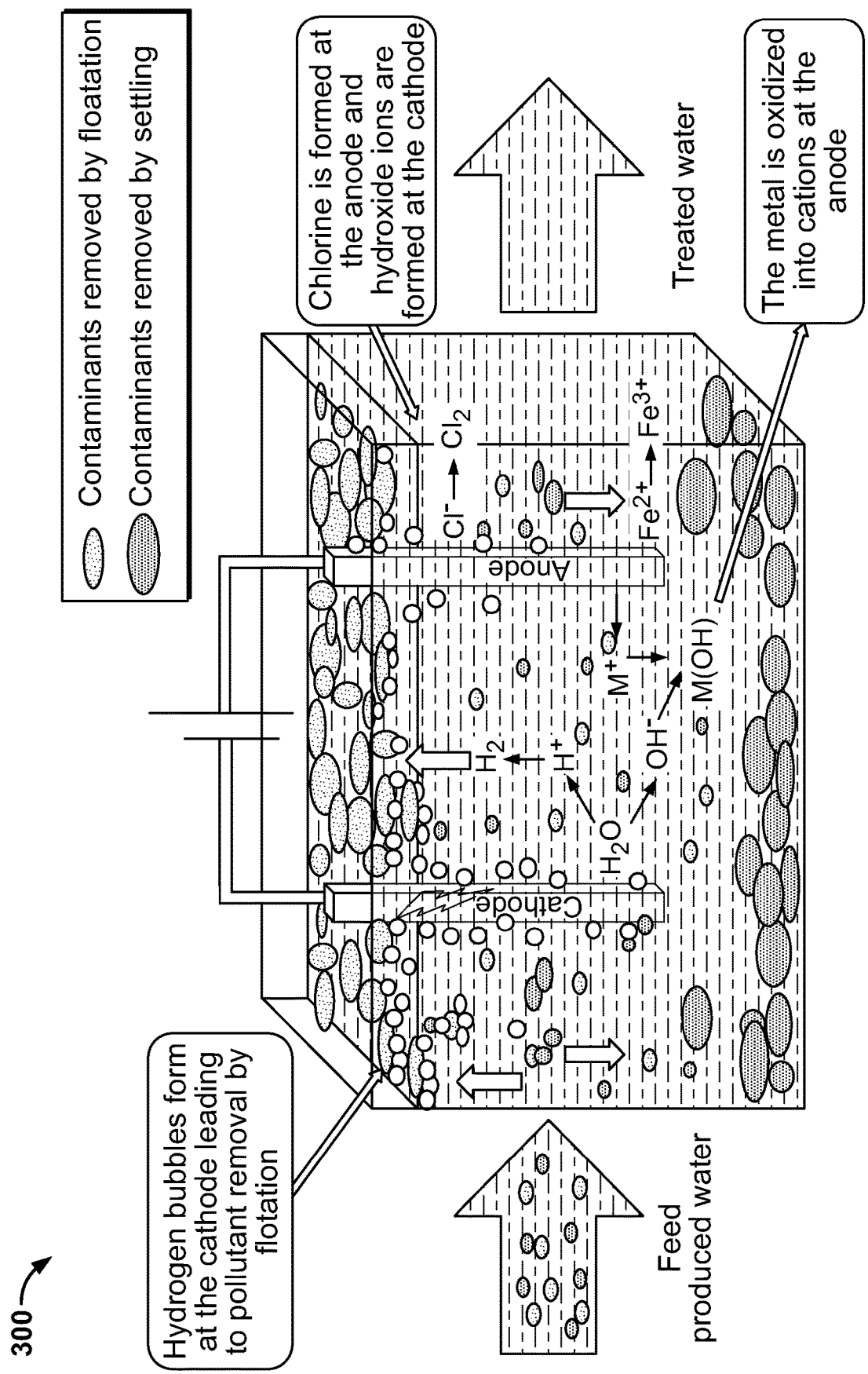
FIG. 3 illustrates an example of a schematic of an electrochemical cell illustrating the reactions and the mechanisms of pollutants removal.

FIG. 3 illustrates an example 300 of a schematic of an electrochemical cell illustrating the reactions that take place and the different mechanisms of pollutants removal. In some implementations, as the electricity passes through produced water, simultaneous reactions can take place. If sacrificial electrodes are used then metal cations can form at the anode, and hydrogen gas and hydroxyl radicals can form at the cathode. The metal cations can react with the hydroxyl group to form metal hydroxides and polyhydroxides. These species can work as coagulants and can help in destabilizing the contaminants present in water. In addition, hydrogen gas formed at the cathode may also help in removing lighter contaminants by flotation. In case non-sacrificial electrodes were used, chloride ions present in the water may be oxidized to form chlorine species which can be used for disinfection or as oxidants. The dissolved organics present in produced water may be oxidized directly by the anode and it might be indirectly oxidized by the chlorine species generated during the electrochemical treatment process.

In some implementations, electrochemical oxidation of organic compounds includes direct oxidation and indirect oxidation. The indirect oxidation involves the formation of chlorine species. If the water contains chloride ions, then, chlorine gas can be generated at the anode according to the following reactions:

$$H_2O \rightarrow O_2 + 4H^+ + 4e^- \quad E° = 1.23 \text{ V/ENH}$$

$$2Cl^{-1} + 2e^- \rightarrow Cl_2 \quad E° = 1.36 \text{ V/ENH}$$

$$H_2O + Cl_2 \rightarrow HClO + H^+ + Cl^-.$$

Depending on the pH, chlorine species such as chlorine, hypochlorous acid, and hypochlorite may be present. Under basic conditions, the following reaction takes place:

$$HClO \rightarrow H^+ + ClO^-.$$

In case bromide is present, the following reactions may take place:

$$HClO + Br^- \rightarrow HOBr + Cl^-$$

$$ClO^- + Br^- \rightarrow BrO^- + Cl^-$$

At the cathode, water can decompose into hydrogen gas and hydroxyl ions as follows:

$$3H_2O + 3e^- \rightarrow \frac{3}{2}H_2 + 3\,OH^- + Cl^- \quad E° = 0 \text{ V/ENH}.$$

The hydroxide ions are highly active and can result in the formation of metal oxides. Another reaction for the formation of hypochlorous acid in water can be written as:

$$H_2O + Cl^- \rightarrow HClO + H^+ + 2e^-.$$

Direct oxidation products of organics (R) may include RO, CO2, NH3 and H+. In direct oxidation active oxygen is in direct contact with the organics. This can be done by using electrodes with catalytic coating.

Figure 4:
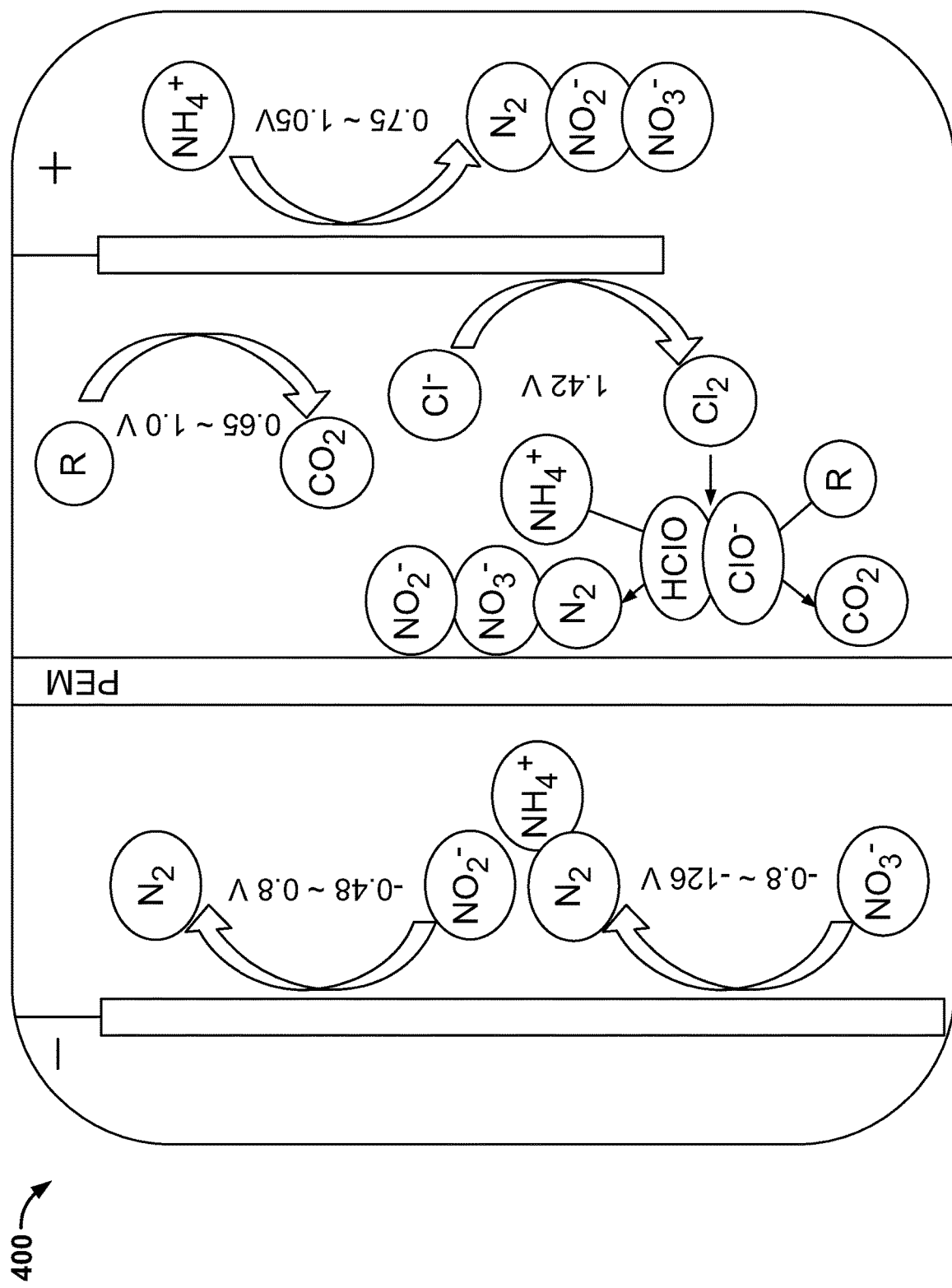
FIG. 4 illustrates an example of direct and indirect oxidation reactions and the reduction reactions.

FIG. 4 illustrates an example 400 of direct and indirect oxidation reactions, and the reduction reactions for organic and inorganic compounds along with the overpotential required for direct oxidation or reduction for a membrane-divided cell. Some oxidation and reduction reactions may take place in an electrochemical oxidation system, where a membrane is used to separate the cathode and anode.

In some implementations, aluminum and iron can be used to generate coagulants in-situ in electrocoagulation. Furthermore, these two materials can be used to treat waste water. Aluminum electrodes can be used for batch operations while iron electrodes can be used for continuous operations because of the corrosion of iron electrodes once they are disconnected. Other electrode materials, for example, copper and zinc, may also be used for electrocoagulation.

In some implementations, the electrode material selection in electrochemical oxidation may affect the performance of the process in terms of contaminates removal. The degradation of potent organic and inorganic compounds can take place at high potentials where oxygen evolution is the main competitive reaction. Thus, a material with high oxygen overpotential can be used to overcome this. Titanium-based electrodes coated with iridium or ruthenium oxide, and boron doped diamond (BDD) electrodes can be used as the electrode. Mixed metal oxide (MMO) electrodes, such as metal electrodes coated with metal oxides, can be used as the electrode. MMO are also known as dimensionally stable anodes (DSA). If dimensionally stable electrodes were used rather than sacrificial iron and aluminum electrodes, then the main mechanisms for contaminates removal are electrochemical oxidation by direct or indirect oxidation, and electroflotation. The coating on the electrodes with metal oxides or catalysts can improve the selectivity of electrochemical oxidation reactions.

At 106, the oxidized solution is injected into an oil reservoir through a water injection well for enhanced oil recovery. For example, as shown in FIG. 2, the oxidized solution, which is water from combined electrocoagulation and electrochemical oxidation unit 232 and free of KHI, is injected into water injection wells 228.

Figure 5:
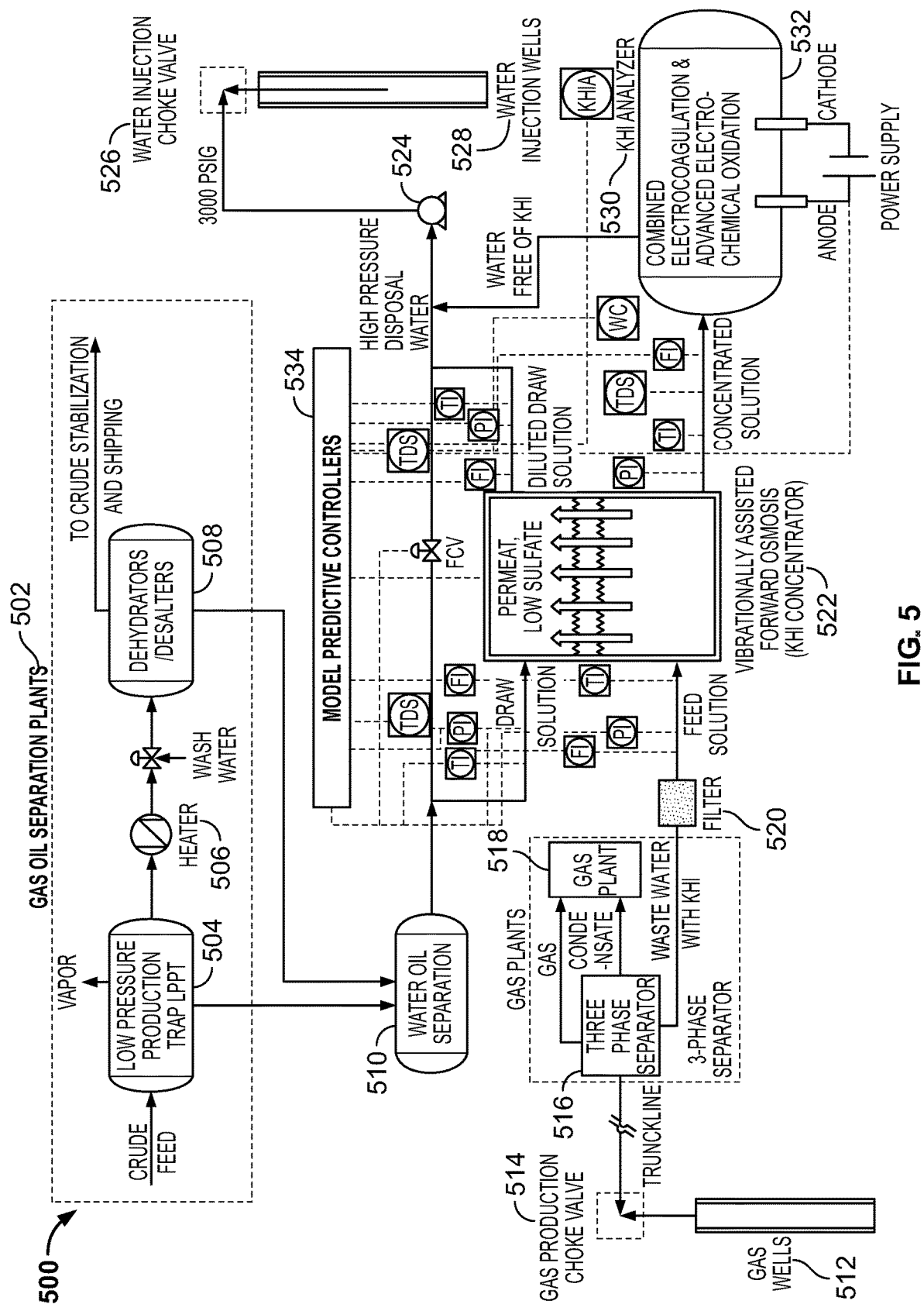
FIG. 5 illustrates an example of a schematic diagram for model predictive control for the KHI concentration and decomposition process illustrated in FIG. 2.

FIG. 5 illustrates an example 500 of a schematic diagram for model predictive control for the KHI concentration and decomposition process illustrated in FIG. 2. In some implementations, the total dissolved solids (TDS) of the concentrated feed solution can be utilized to monitor ingress of salts from the draw solution. The TDS across the FO membrane for both draw and feed stream inlet and outlet can be monitored to measure and monitor the performance of FO unit 522. Water concentration (WC) in the concentrated solution from FO unit 522 can be utilized to monitor the performance of the FO by increasing or decreasing the flow of the draw solution to FO unit 522. WC can be utilized to measure the chemical concentration. KHI analyzer 530 from the electrocoagulation can be used to monitor the performance of the electrocoagulation and adjust variables accordingly.

In some implementations, a multivariable model predictive controller can be used to increase the decomposition of the KHI in the feed solution and to reduce the water content in the KHI stream to the storage. In some implementations, a closed loop controller in distributed control system (DCS) can be configured using multiple process variables. These variables can include minimum TDS of the concentrated KHI solution from the FO unit 522, minimum water in the concentrated KHI solution from the FO unit 522. Additional variables that can be controlled can include feed solution temperature, pressure, and flow, draw solution TDS, temperature, pressure, and flow, concentrated solution TDS, temperature, pressure, flow and water concentration (WC), diluted Draw solution TDS, temperature, pressure, and flow, flow control valve opening (FCV), and power input to the electrocoagulation unit 532.

In some implementations, prediction models for the aforementioned process variables can be built using mechanistic model, by experiment, or by using the artificial intelligence of the historical data. Model predictive controllers (MPC), for example, multi-variable controllers (MVC), can be used to control processes that increase the decomposition of KHI and other chemicals with low water concentration. It can also be used to predict the performance of the unit and arrange for planned maintenance accordingly to recover the performance loss of KHI decomposition.

Figure 6:
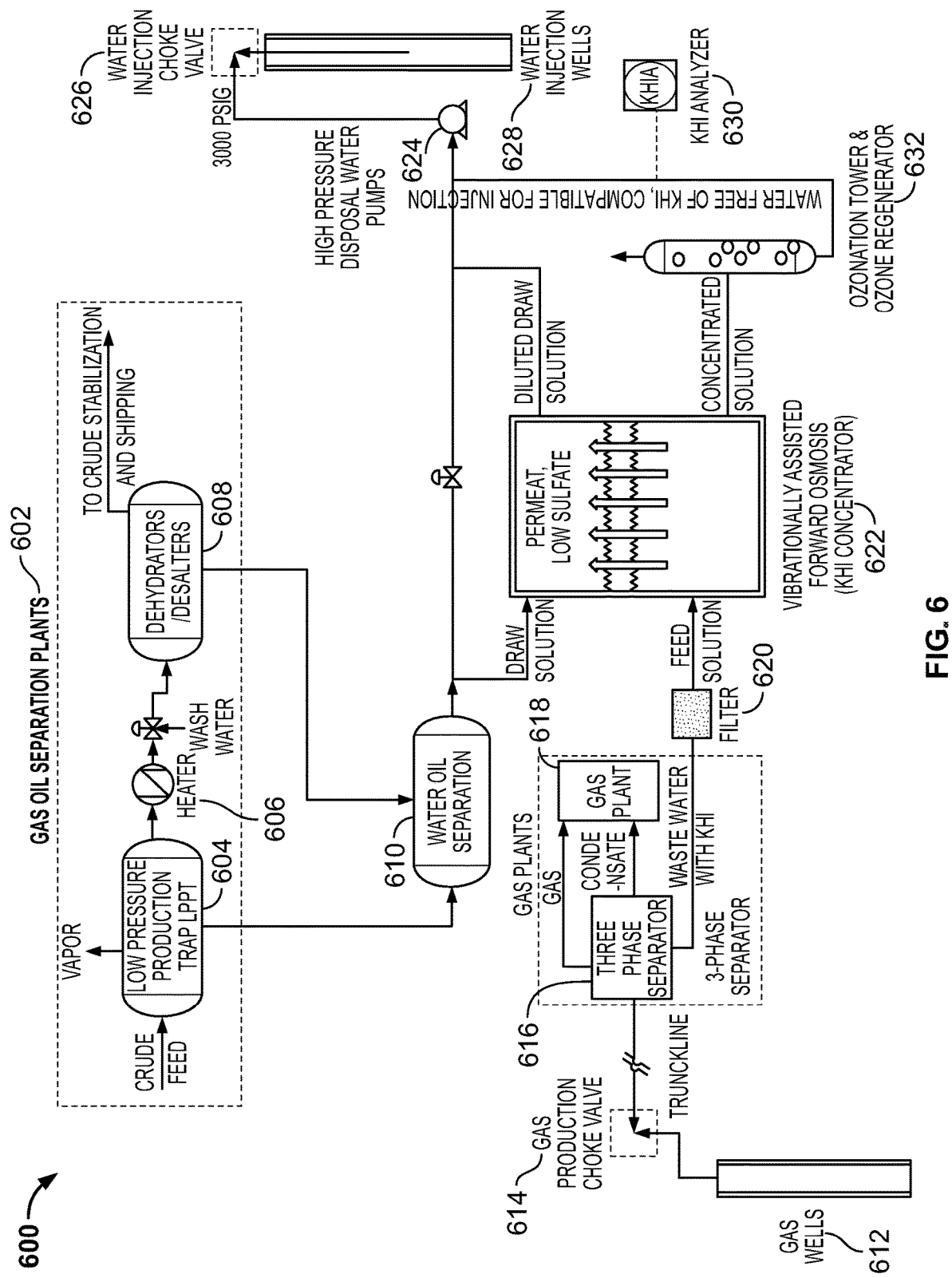
FIG. 6 illustrates an example of a schematic diagram for concentrating and decomposing KHI in waste water from gas streams based on an ozonation process for oxidation.

FIG. 6 illustrates an example 600 of a schematic diagram for concentrating and decomposing KHI in waste water from gas streams, where KHI decomposition is done using an ozonation process for oxidation of the concentrated feed solution from the FO process. In some implementations, ozonation can allow different organic compounds such as KHI, oil, and other gas field chemicals present in water to be oxidized, through the generation of hydroxyl radicals (·OH). The oxidation of compounds is a process that occurs due to the emission of ozone (gas) that spontaneously transforms into oxygen. The process includes joining three oxygen molecules to form ozone, but the third oxygen molecule can be unstable and binds with the polluting particles in water, such as KHI or oil, until these polluting particles are eliminated. The water can be reused for water injection without the issue of incompatibility when mixed with other water or any blockage formation.

As shown in FIG. 6, the concentrated feed solution containing KHI, from vibrationally assisted forward osmosis process 622, can be treated in significantly reduced volume in a ozonation unit, such as ozonation tower and ozone regenerator 632, instead of combined electrocoagulation and electrochemical oxidation unit 232 in FIG. 2, to safely decompose the KHI and other gas field chemicals. During the ozonation process, one or more KHI containing aqueous solutions can be bubbled with ozone, and clean water is obtained. In some implementations, the ozonation process may be conducted in a tank, or other water storage container.

Figure 7:
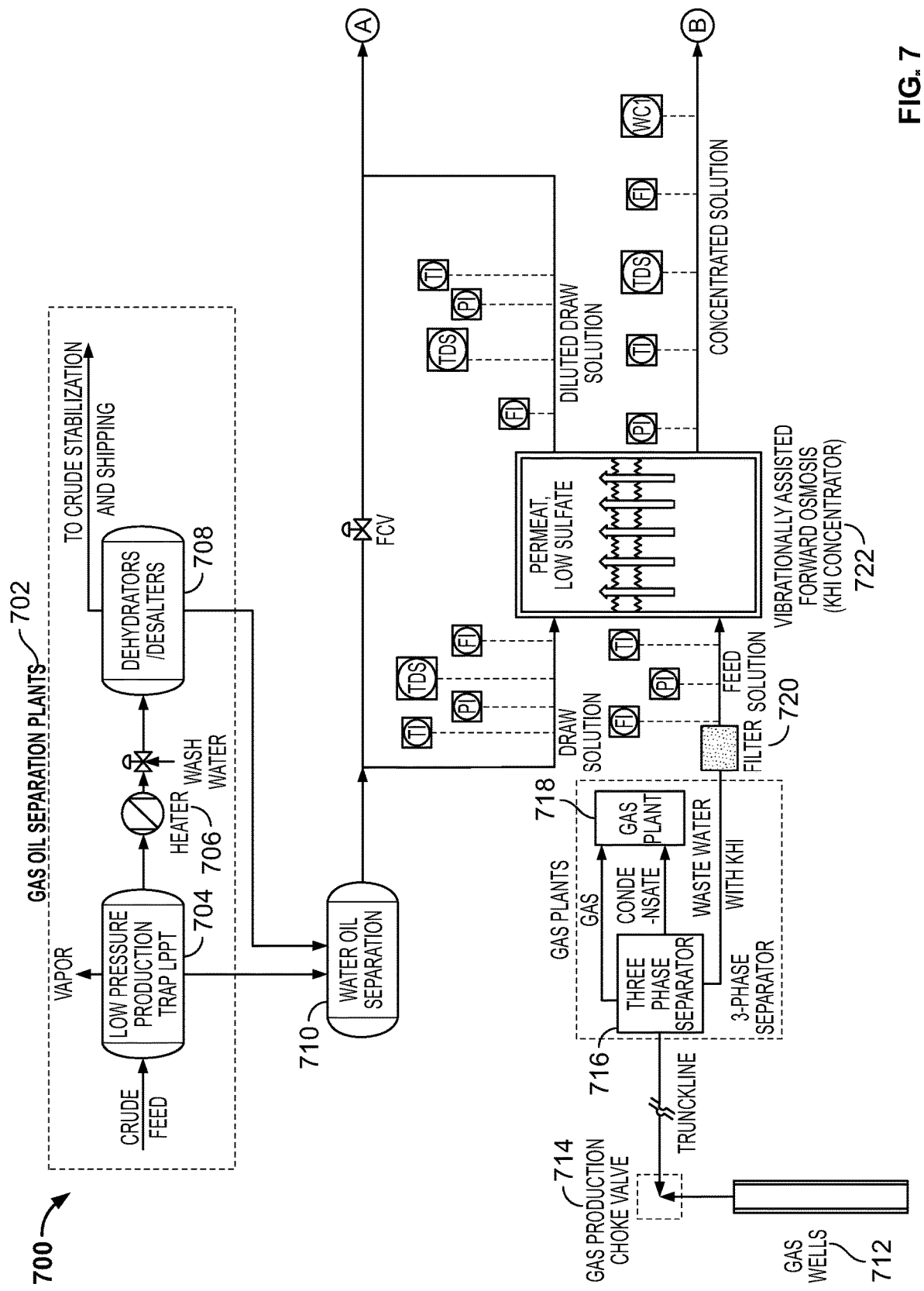
FIG. 7 illustrates an example of a schematic diagram for concentrating and decomposing KHI in waste water from gas streams based on vacuum separation followed by oxidation using electrocoagulation.
Figure 7:
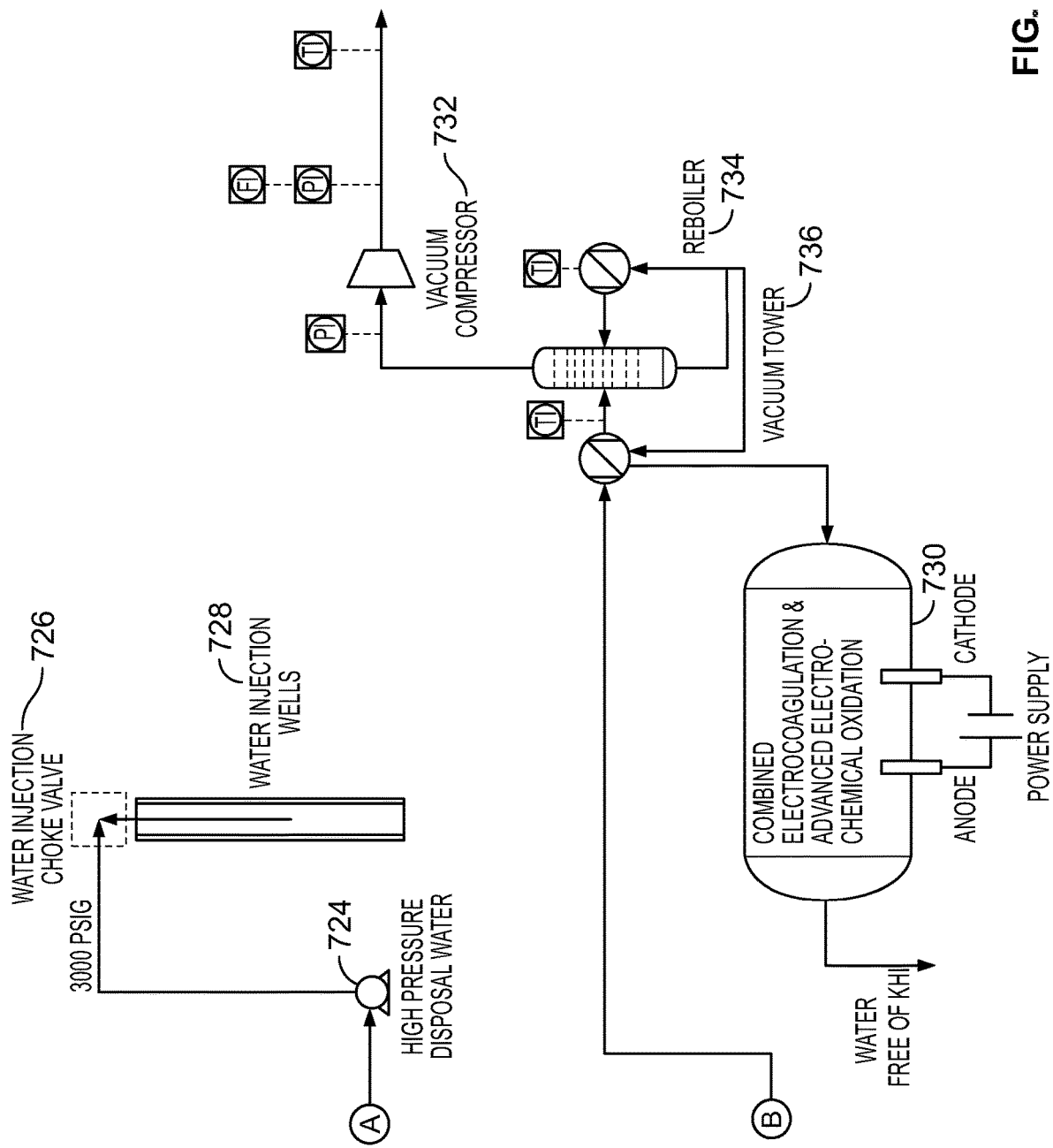

FIG. 7 illustrates an example 700 of a schematic diagram for concentrating and decomposing KHI in waste water from gas streams, where KHI decomposition is done using vacuum separation followed by oxidation using electrocoagulation for oxidation of the concentrated feed solution from the FO process. In some implementations, the KHI decomposition process can be utilized to separate remaining water or volatile component from the KHI and gas field chemicals utilizing the FO as concentration step to increase the concentration of KHI in order to reduce energy consumption, followed by vacuum distillation step using vacuum distillation column or vacuum separator. In some implementations, the concentrated KHI solution can be directed to vacuum distillation operating at 1.0 to 13.0 psia to reduce the operating temperature of KHI and avoid potential degradation.

Figure 8:
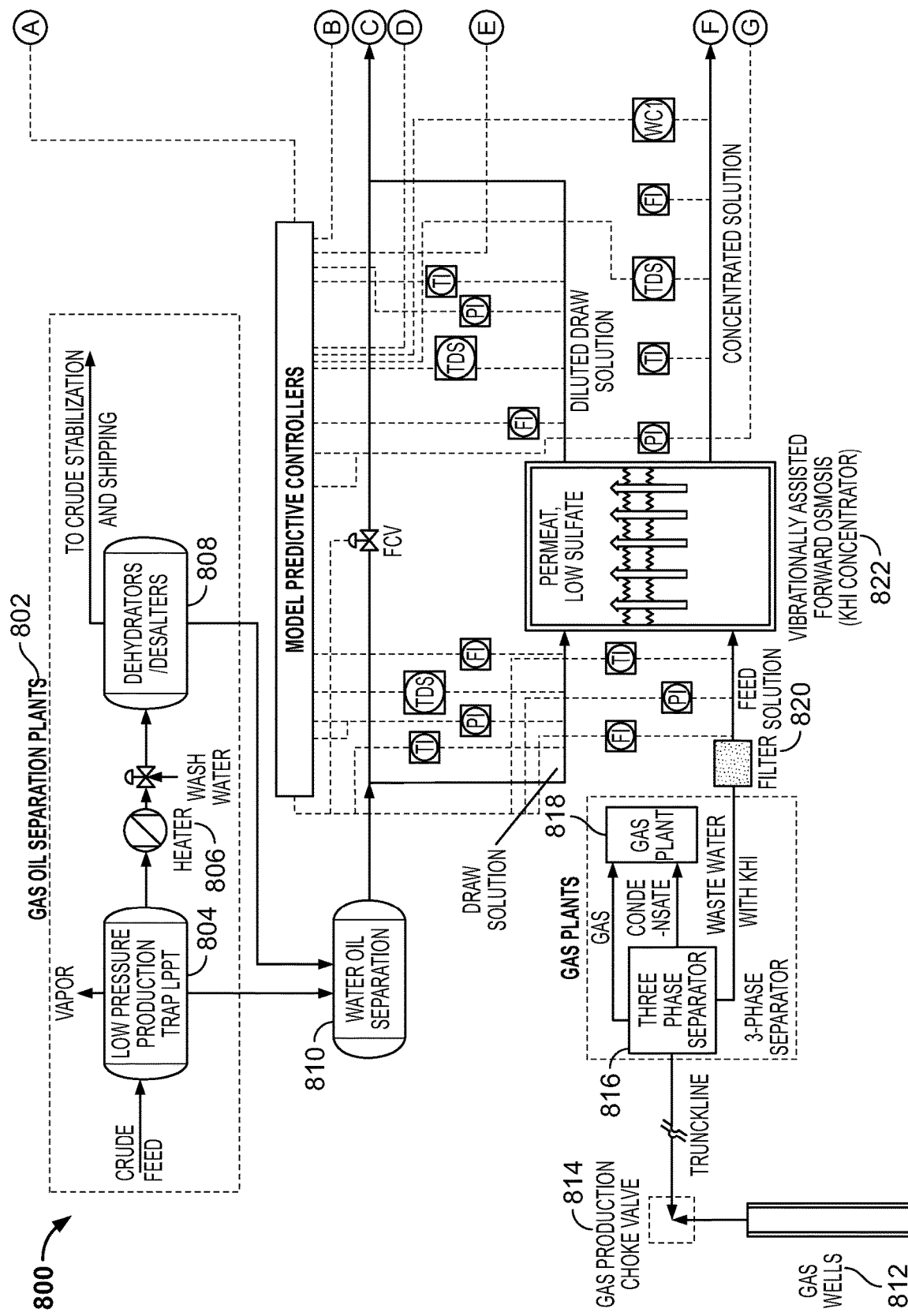
FIG. 8 illustrates an example of a schematic diagram for model predictive control for the KHI concentration and decomposition process illustrated in FIG. 7.
Figure 8:
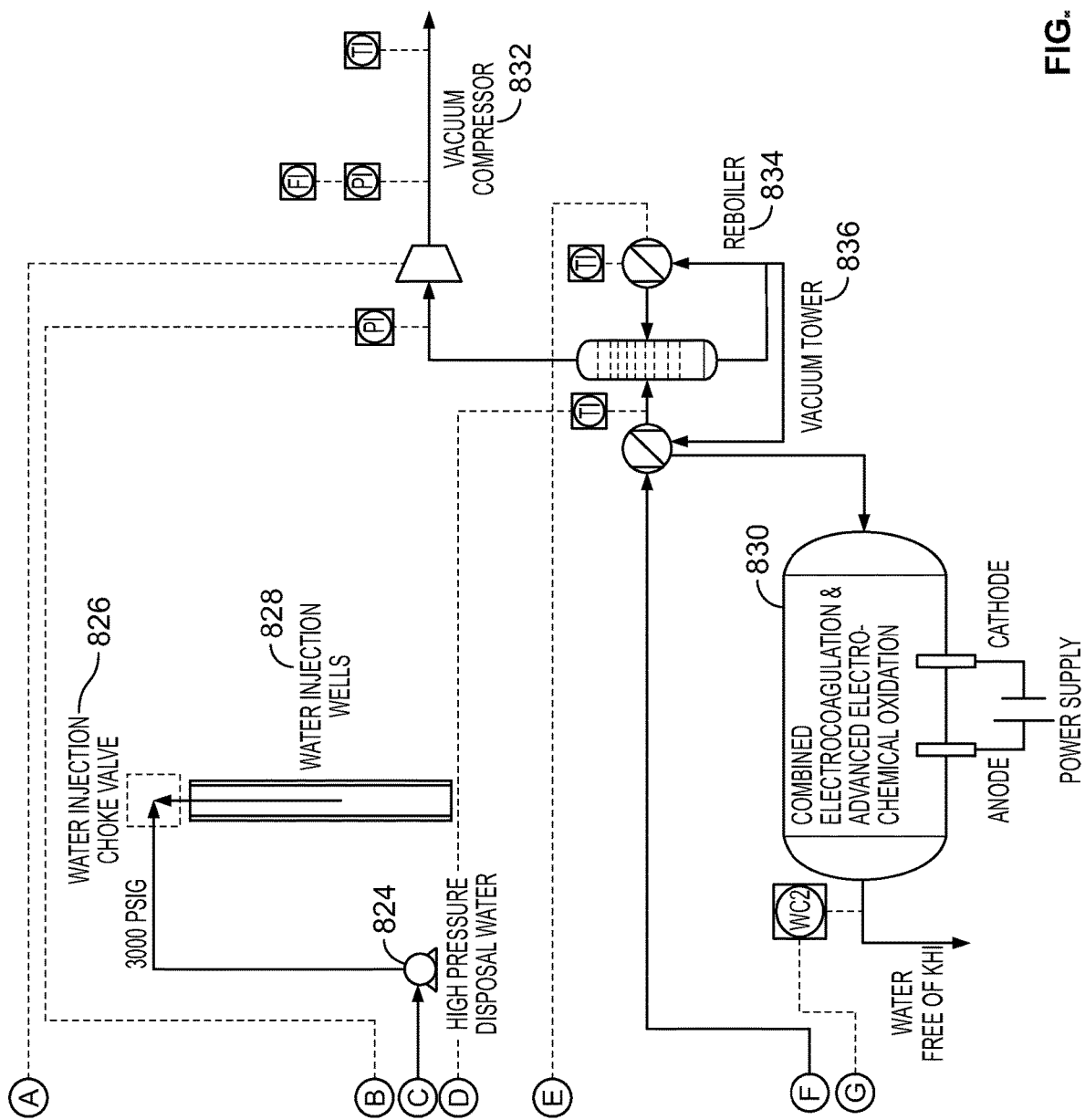

FIG. 8 illustrates an example 800 of a schematic diagram for model predictive control for the KHI concentration and decomposition process illustrated in FIG. 7. In some implementations, the TDS of the concentrated feed solution can be utilized to monitor ingress of salts from the draw solution. The TDS across the FO membrane for both draw and feed stream inlet and outlet can be monitored to measure and monitor the performance of FO unit 822. Water concentration (WC) in the concentrated solution from FO unit 822 can be utilized to monitor the performance of FO unit 822 by increasing or decreasing the flow of the draw solution to FO unit 822. WC can be utilized to measure the chemical concentration.

In some implementations, a multivariable model predictive controller can be used to increase the recovery of the KHI in the feed solution and to reduce the water content in the KHI stream to the storage.

In some implementations, a closed loop controller can be configured in distributed control system (DCS) using multiple process variables. These variables can include can include minimum TDS of the concentrated KHI solution from FO unit 822, minimum water in the concentrated KHI solution from FO unit 822's WC1 and the vacuum distillation unit. Additional variables that can be controlled can include feed solution temperature, pressure, and flow, draw solution TDS, temperature, pressure, and flow, concentrated solution TDS, temperature, pressure, flow, and water concentration (WC1 & WC2), diluted draw solution TDS, temperature, pressure, and flow, flow control valve (FCV) opening, reboiler temperature, vacuum distillation pressure, and vacuum compressor discharge temperature, pressure, and flow.

In some implementations, two prediction models for the aforementioned process variables can be built using mechanistic model, by experiment, or by using the artificial intelligence of the historical data. Model predictive controllers (MPC), for example, multi-variable controllers (MVC), can be used to control processes that increase decomposition of KHI and other chemicals with low water concentration. It can also be used to predict the performance of the unit and arrange for planned maintenance accordingly to recover the performance loss of KHI decomposition.

Figure 9:
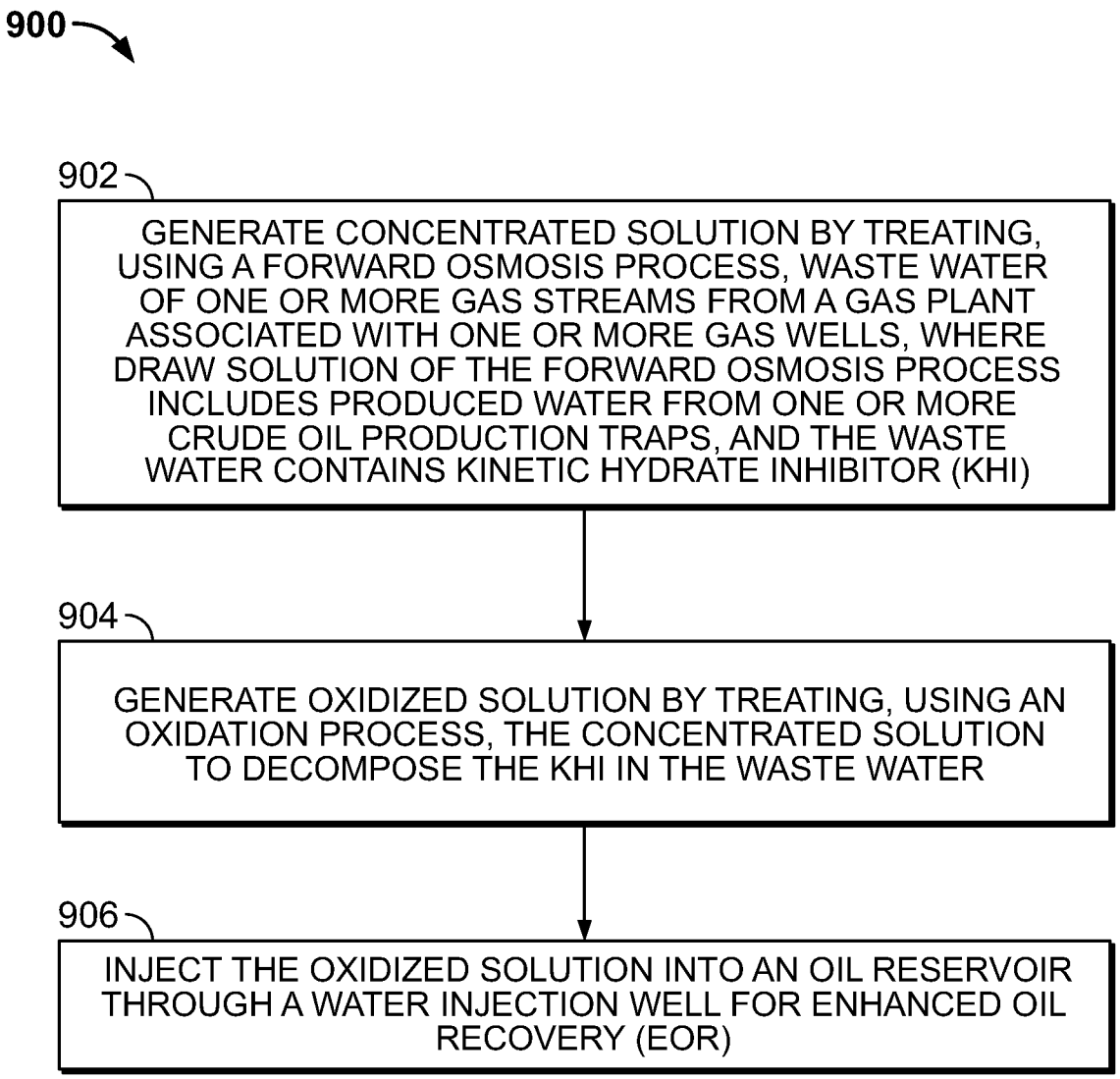
FIG. 9 illustrates an example process of treating waste water streams for enhanced oil recovery.

FIG. 9 illustrates an example process 900 of treating waste water streams for enhanced oil recovery.

At 902, waste water of one or more gas streams from a gas plant associated with one or more gas wells is treated using a forward osmosis process to generate concentrated solution, where draw solution of the forward osmosis process comprises produced water from one or more crude oil production traps, and the waste water contains kinetic hydrate inhibitor.

At 904, the concentrated solution is treated using an oxidation process to generate oxidized solution.

At 906, the oxidized solution is injected into an oil reservoir through a water injection well for enhanced oil recovery.

Certain aspects of the subject matter described here can be implemented as a method. Waste water of one or more gas streams from a gas plant associated with one or more gas wells is treated using a forward osmosis process to generate concentrated solution, where draw solution of the forward osmosis process includes produced water from one or more crude oil production traps, and the waste water contains kinetic hydrate inhibitor (KHI). The concentrated solution is treated using an oxidation process to generate oxidized solution by decomposing the KHI in the waste water. The oxidized solution is injected into an oil reservoir through a water injection well for enhanced oil recovery (EOR).

Methods can include one or more of the following features.

In some implementations, the draw solution is from a gas oil separation plant (GOSP) associated with the one or more crude oil production traps.

In some implementations, the forward osmosis process includes a vibration-assisted forward osmosis process.

In some implementations, generating the concentrated solution includes monitoring ingress of salt content from the draw solution using total dissolved solids (TDS) of the concentrated solution.

In some implementations, the oxidation process includes a combination of an electrocoagulation process and an electrochemical oxidation process, the electrocoagulation process includes multiple electrocoagulation reactions including multiple anode side reactions and multiple cathode side reactions, and the electrochemical oxidation process includes at least one of direct oxidation and indirect oxidation.

In some implementations, the oxidation process includes an ozonation process of the concentrated solution.

In some implementations, the oxidation process includes vacuum separation followed by oxidation using electrocoagulation, and the vacuum separation includes directing the concentrated solution to vacuum distillation.

In some implementations, generating the concentrated solution by treating, using the forward osmosis process, the waste water of one or more gas streams from the gas plant associated with one or more gas wells includes passing the waste water through a semi-permeable membrane.

In some implementations, an osmotic pressure of the produced water is higher than an osmotic pressure of the waste water during the forward osmosis process.

In some implementations, the waste water is treated using the forward osmosis process to generate diluted draw solution, and injecting the oxidized solution into the oil reservoir through the water injection well for EOR includes injecting the diluted draw solution and the oxidized solution into the oil reservoir through the water injection well for EOR.

Certain aspects of the subject matter described here can be implemented as a system. The system includes a forward osmosis unit, an oxidation unit, and a pump unit. The forward osmosis unit is configured to generate concentrated solution by treating, using a forward osmosis process, waste water of one or more gas streams from a gas plant associated with one or more gas wells, where draw solution of the forward osmosis process includes produced water from one or more crude oil production traps, and the waste water contains kinetic hydrate inhibitor (KHI). The oxidation unit is coupled to the forward osmosis unit and is configured to generate oxidized solution by treating, using an oxidation process, the concentrated solution to decompose the KHI in the waste water. The pump unit is coupled to both the forward osmosis unit and the oxidation unit and is configured to inject the oxidized solution into an oil reservoir through a water injection well for enhanced oil recovery (EOR).

Systems can include one or more of the following features.

In some implementations, the draw solution is from a gas oil separation plant (GOSP) associated with the one or more crude oil production traps.

In some implementations, the forward osmosis process includes a vibration-assisted forward osmosis process.

In some implementations, the forward osmosis unit is further configured to monitor ingress of salt content from the draw solution using total dissolved solids (TDS) of the concentrated solution.

In some implementations, the oxidation process includes a combination of an electrocoagulation process and an electrochemical oxidation process, the electrocoagulation process includes multiple electrocoagulation reactions including multiple anode side reactions and multiple cathode side reactions, and the electrochemical oxidation process includes at least one of direct oxidation and indirect oxidation.

In some implementations, the oxidation process includes an ozonation process of the concentrated solution.

In some implementations, the oxidation process includes vacuum separation followed by oxidation using electrocoagulation, and the vacuum separation includes directing the concentrated solution to vacuum distillation.

In some implementations, the forward osmosis unit is further configured to pass the waste water through a semi-permeable membrane.

In some implementations, an osmotic pressure of the produced water is higher than an osmotic pressure of the waste water during the forward osmosis process.

In some implementations, the forward osmosis unit is further configured to generate diluted draw solution by treating, using the forward osmosis process, the waste water, and the pump unit is further configured to injecting the diluted draw solution into the oil reservoir through the water injection well for EOR.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method, comprising:
generating concentrated solution by treating, using a forward osmosis process, waste water of one or more gas streams from a gas plant associated with one or more gas wells, wherein draw solution of the forward osmosis process comprises produced water from one or more crude oil production traps, and the waste water contains kinetic hydrate inhibitor (KHI);
generating oxidized solution by treating, using an oxidation process, the concentrated solution to decompose the KHI in the waste water, wherein the oxidation process comprises a combination of an electrocoagulation process and an electrochemical oxidation process, the electrocoagulation process comprises a plurality of electrocoagulation reactions comprising a plurality of anode side reactions and a plurality of cathode side reactions, and the electrochemical oxidation process comprises at least one of direct oxidation and indirect oxidation; and
injecting the oxidized solution into an oil reservoir through a water injection well for enhanced oil recovery (EOR).

2. The method of claim 1, wherein the draw solution is from a gas oil separation plant (GOSP) associated with the one or more crude oil production traps.

3. The method of claim 1, wherein the forward osmosis process comprises a vibration-assisted forward osmosis process.

4. The method of claim 1, wherein generating the concentrated solution comprises monitoring ingress of salt content from the draw solution using total dissolved solids (TDS) of the concentrated solution.

5. The method of claim 1, wherein the oxidation process comprises vacuum separation followed by oxidation using electrocoagulation, and the vacuum separation comprises directing the concentrated solution to vacuum distillation.

6. The method of claim 1, wherein generating the concentrated solution by treating, using the forward osmosis process, the waste water of one or more gas streams from the gas plant associated with one or more gas wells comprises passing the waste water through a semi-permeable membrane.

7. The method of claim 1, wherein an osmotic pressure of the produced water is higher than an osmotic pressure of the waste water during the forward osmosis process.

8. The method of claim 1, further comprising:
generating diluted draw solution by treating, using the forward osmosis process, the waste water; and wherein:
injecting the oxidized solution into the oil reservoir through the water injection well for EOR comprises injecting the diluted draw solution and the oxidized solution into the oil reservoir through the water injection well for EOR.

9. A system, comprising:
a forward osmosis unit;
an oxidation unit; and
a pump unit; wherein:
the forward osmosis unit is configured to generate concentrated solution by treating, using a forward osmosis process, waste water of one or more gas streams from a gas plant associated with one or more gas wells, wherein draw solution of the forward osmosis process comprises produced water from one or more crude oil production traps, and the waste water contains kinetic hydrate inhibitor (KHI);
the oxidation unit is coupled to the forward osmosis unit and is configured to generate oxidized solution by treating, using an oxidation process, the concentrated solution to decompose the KHI in the waste water, wherein the oxidation process comprises a combination of an electrocoagulation process and an electrochemical oxidation process, the electrocoagulation process comprises a plurality of electrocoagulation reactions comprising a plurality of anode side reactions and a plurality of cathode side reactions, and the electrochemical oxidation process comprises at least one of direct oxidation and indirect oxidation; and
the pump unit is coupled to both the forward osmosis unit and the oxidation unit and is configured to inject the oxidized solution into an oil reservoir through a water injection well for enhanced oil recovery (EOR).

10. The system of claim 9, wherein the draw solution is from a gas oil separation plant (GOSP) associated with the one or more crude oil production traps.

11. The system of claim 9, wherein the forward osmosis process comprises a vibration-assisted forward osmosis process.

12. The system of claim 9, wherein the forward osmosis unit is further configured to monitor ingress of salt content from the draw solution using total dissolved solids (TDS) of the concentrated solution.

13. The system of claim 9, wherein the oxidation process comprises vacuum separation followed by oxidation using electrocoagulation, and the vacuum separation comprises directing the concentrated solution to vacuum distillation.

14. The system of claim 9, wherein the forward osmosis unit is further configured to pass the waste water through a semi-permeable membrane.

15. The system of claim 9, wherein an osmotic pressure of the produced water is higher than an osmotic pressure of the waste water during the forward osmosis process.

16. The system of claim 9, wherein the forward osmosis unit is further configured to generate diluted draw solution by treating, using the forward osmosis process, the waste water, and wherein the pump unit is further configured to injecting the diluted draw solution into the oil reservoir through the water injection well for EOR.

17. A method, comprising:
generating concentrated solution by treating, using a forward osmosis process, waste water of one or more gas streams from a gas plant associated with one or more gas wells, wherein draw solution of the forward osmosis process comprises produced water from one or more crude oil production traps, and the waste water contains kinetic hydrate inhibitor (KHI);
generating diluted draw solution by treating, using the forward osmosis process, the waste water;
generating oxidized solution by treating, using an oxidation process, the concentrated solution to decompose the KHI in the waste water; and
injecting the diluted draw solution and the oxidized solution into an oil reservoir through a water injection well for enhanced oil recovery (EOR).

18. The method of claim 17, wherein the oxidation process comprises an ozonation process of the concentrated solution.

19. The method of claim 17, wherein the oxidation process comprises vacuum separation followed by oxidation using electrocoagulation, and the vacuum separation comprises directing the concentrated solution to vacuum distillation.

20. The method of claim 17, wherein an osmotic pressure of the produced water is higher than an osmotic pressure of the waste water during the forward osmosis process.

* * * * *